US005907833A

United States Patent [19]

Lee

[11] Patent Number: 5,907,833

[45] Date of Patent: May 25, 1999

[54] APPARATUS FOR FRANKING MAIL

[75] Inventor: Daniel John Lee, Brentwood, United Kingdom

[73] Assignee: Neopost Limited, Essex, United Kingdom

[21] Appl. No.: 08/791,682

[22] Filed: Jan. 30, 1997

[30] Foreign Application Priority Data

Jan. 31, 1996 [GB] United Kingdom .................... 9601948

[51] Int. Cl.[6] ............................ G07B 17/00; G03B 27/00

[52] U.S. Cl. ............................ 705/410; 355/75; 355/133

[58] Field of Search ..................... 355/75, 133; 705/401, 705/408, 410, 411

[56] References Cited

U.S. PATENT DOCUMENTS 4,397,542 8/1983 Brodesser ................................ 347/139

4,868,757 9/1989 Gil .................................... 364/464.03

5,375,172 12/1994 Chrosny ................................... 380/51

FOREIGN PATENT DOCUMENTS 0492622 7/1992 European Pat. Off. .

*Primary Examiner*—Edward R. Cosimano

*Attorney, Agent, or Firm*—Shoemaker and Mattare, Ltd

[57] ABSTRACT

Apparatus for franking mail items is disclosed. The apparatus includes a display constructed for co-operation with a photocopier in which the display is controlled to display a franking pattern to be printed, the display being located as an original image in the photocopier, and the photocopier is operated to copy the displayed pattern and to print the pattern as a franking impression on a mail item. A sensor detects scanning of the display by the photocopier and the output of the sensor is utilised to control the display to ensure that only a number of mails items are franked with postage which has been accounted for.

14 Claims, 2 Drawing Sheets

APPARATUS FOR FRANKING MAIL

BACKGROUND OF THE INVENTION

This invention to relates to franking of mail items with postage charge.

Known postage meters for franking mail items include accounting means to carry out accounting functions in respect of postage charges dispensed by the meter and a printer to print a franking impression on the each mail item to indicate that a postage charge has been applied to the mail item and has been levied against the user of the postage meter. Earlier postage meters incorporated a drum printer to print the franking impression. The drum printer comprises a rotatable print drum carrying a fixed printing die to print invariable parts of the impression and sets of print wheels which are set to print a required value of postage charge and the date on which the printing is effected. In more recent developments of postage meters the rotatable print drum has been replaced by electronic digital printing devices. These digital printing devices comprise means to print dots selectively in a plurality of positions in a column and the franking impression is printed in a succession of print cycles in each of which cycles the printing device prints dots in positions such as to build up the impression in a column-by-column manner. Digital printing devices proposed for this purpose include thermal printers and ink jet.

SUMMARY OF THE INVENTION

According to one aspect of the present invention apparatus for franking mail items comprises a unit including electronic accounting and control means; display means controlled by the accounting and control means and means to enable input of control and data signals to the accounting and control means; said accounting and control means being operable in response to control and data signals to carry out accounting functions in respect of a postage charge to be applied to a mail item and to control the display means to display a pattern corresponding to a franking impression to be printed on a mail item, said franking impression including data indicative of the postage charge; and, in operative combination with said unit, photocopying apparatus operable to scan the pattern displayed by the display means and to print a franking impression corresponding to the pattern on a mail item.

According a second aspect of the present invention apparatus for franking mail items comprises a unit including electronic accounting and control means; display means controlled by the accounting and control means and means to enable input of control and data signals to the accounting and control means; said accounting and control means being operable in response to control and data signals to carry out accounting functions in respect of a postage charge to be applied to a mail item and to control the display means to display a pattern corresponding to a franking impression to be printed on a mail item, said franking impression including data indicative of the postage charge; said unit being so constructed as to enable the unit to be located in operative combination with photocopying apparatus whereby the photocopying apparatus may be operated to scan the pattern displayed by the display means and to print a franking impression corresponding to the pattern on a mail item.

BRIEF DESCRIPTION OF THE DRAWING

An embodiment of the invention will now be described by way of example with reference to the drawings in which.

DESCRIPTION OF THE PREFERRED EMBODIMENT

Figure 1:
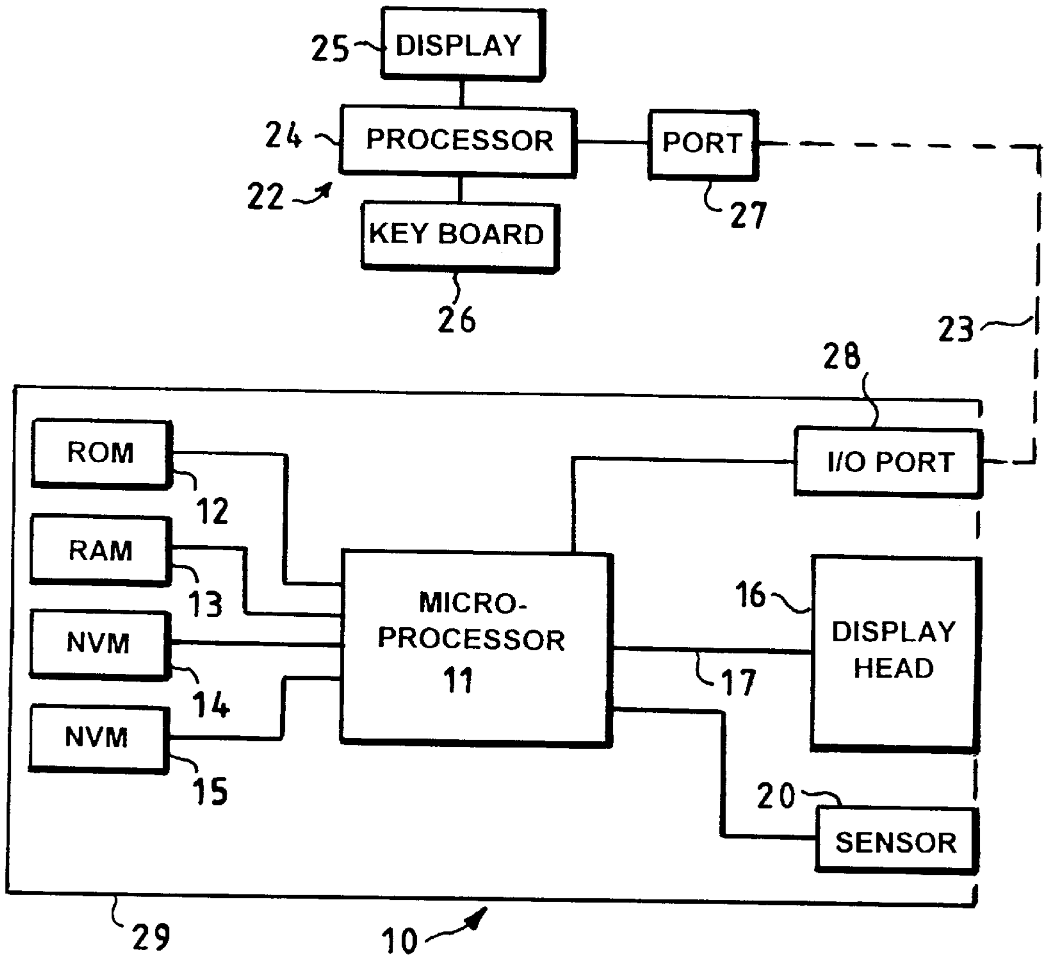
FIG. 1 is a block diagram of postage metering apparatus.

Referring first to FIG. 1 of the drawing, a metering unit 10 includes a microprocessor 11 for carrying out accounting and control functions in respect of metering postage charges for application to mail items. The microprocessor operates under control of program instructions stored in a read only memory (ROM) 12. A random access memory (RAM) 13 is provided as a working store for the microprocessor. Non-volatile memory (NVM) 14 and 15 is provided for the storage of data which is to be retained when the unit 10 is not powered. The NVM memory is utilised for the storing of accounting data in respect of postage metered by the unit and for example as is well known in the postage meter art, the memory 14, 15 provides a descending register for storing a value of credit available for franking mail items, an ascending register for storing an accumulated value of postage charge dispensed by the unit, an items count of the number of items franked with postage charge by the unit and a high items count of the number of items franked with a postage charge higher than a predetermined value. Also as is well known in the postage meter art, each register is replicated in order to maintain integrity of the accounting data in the event of fault or power failure during operation of the unit, two copies of each register being provided in each of the memory devices 14 and 15.

Figure 2:
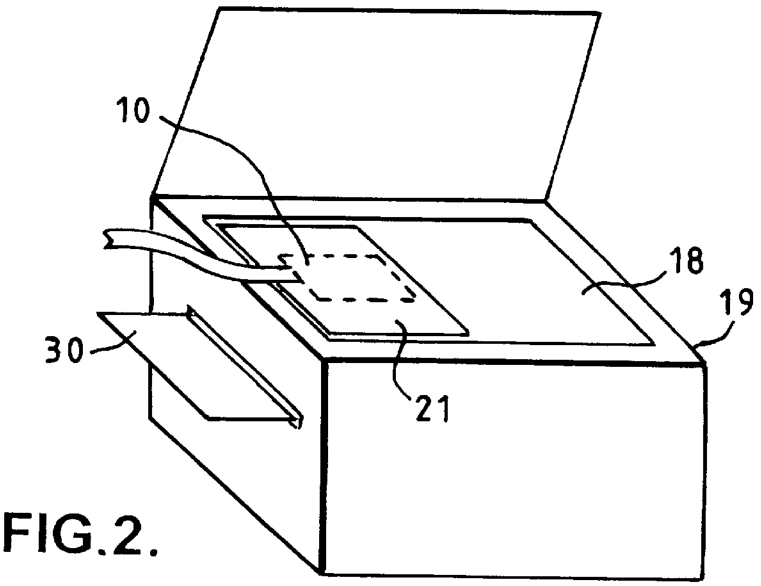
FIG. 2 illustrates the postage metering device in combination with a copying machine.

A display head 16 is driven by an output on line 17 from the microprocessor 11 to display a pattern corresponding to a franking impression to be printed on a mail item. The unit 10 is constructed as a relatively thin planar module to enable it to be located, as shown in FIG. 2, on a transparent copying platform 18 of a photocopier 19. The display 16 is located in a lower surface of the unit so that the photocopying apparatus of the photocopier is able to scan the display. The photocopier 19 is operated in the normal manner of copying from an original placed on the transparent platform 18 onto a sheet fed through the photocopier. Accordingly when an envelope is fed through the photocopier, and the photocopying apparatus is operated, the pattern of the franking impression displayed on the unit 10 is scanned by the scanning means of the photocopier to produce an image of the display and from that image to print the franking impression on the envelope and thereby produce a franked mail item 30. The display head may be a liquid crystal display.

A sensor 20 is provided on the unit 10 in the lower face thereof so that the sensor is responsive to light emitted by the photocopying apparatus in scanning the pattern displayed by the display head. The microprocessor 11 is operative in response to the sensor 20 sensing light emitted by the photocopying apparatus to prevent more than one franking impression being printed in respect of each accounting for postage charge.

The components of the unit 10 are housed within a sealed secure housing 29 to prevent unauthorised access to the accounting and control of the unit.

Figure 3:
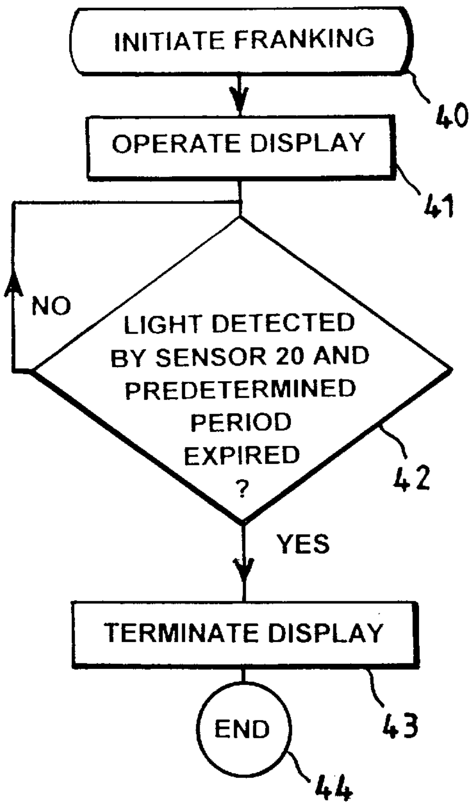
FIG. 3 is a flow chart illustrating operation of the postage metering apparatus in applying postage to a single mail item.
Figure 5:
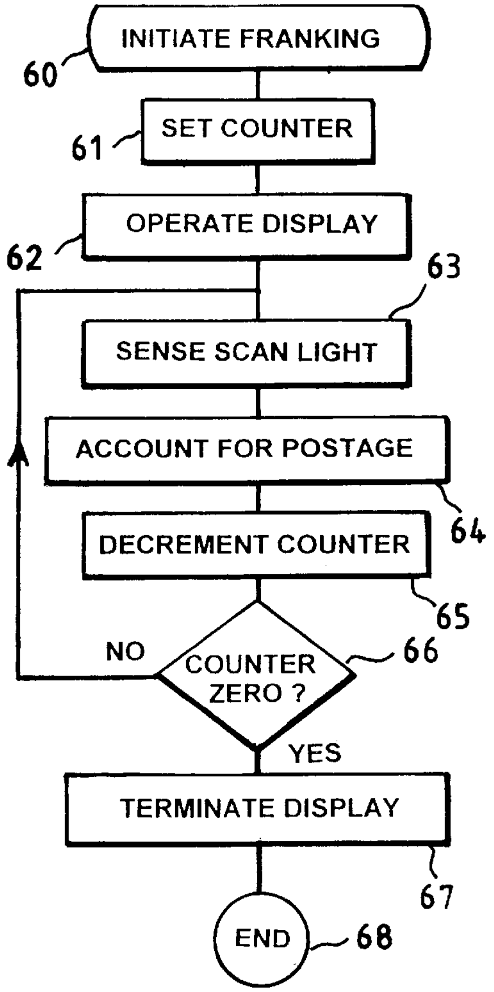
FIG. 5 is a flow chart illustrating an alternative operation of the postage metering apparatus in applying postage to a plurality of items
Figure 4:
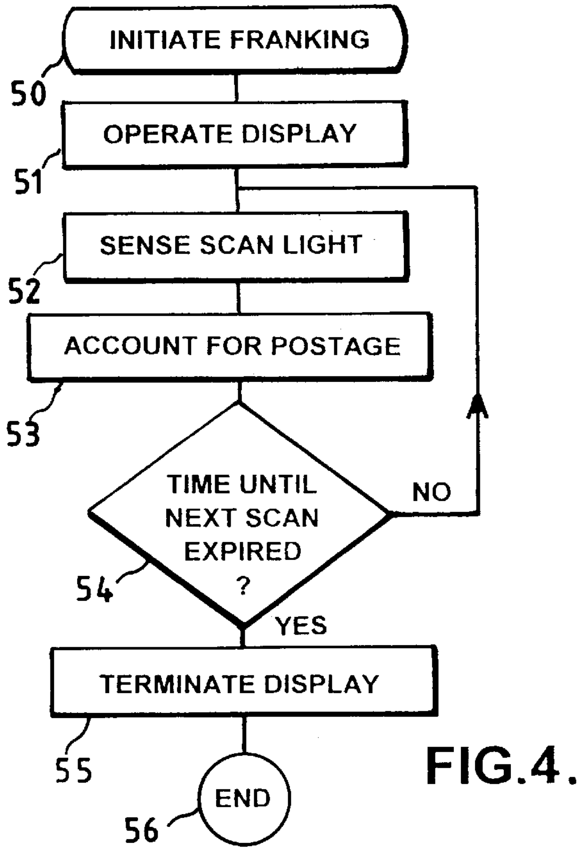
FIG. 4 is a flow chart illustrating operation of the postage metering apparatus in applying postage to a plurality of items.

Referring to the flow chart of FIG. 3, when a franking is to be performed after initiation of franking (block 40) the microprocessor 11 operates the display head to display (block 41) a pattern corresponding to a franking impression to be printed. Upon detection by the sensor 20 of the light emitted during scanning by the photocopying apparatus and after expiry of a predetermined period (block 42) sufficient to enable the photocopying apparatus to scan the displayed pattern, the microprocessor terminates display (block 43) of the pattern so that if more than one envelope is fed through the photocopier, only the first envelope receives a franking impression. The franking operation terminates at 44. If the predetermined period has not expired, the microprocessor continues to operate the display to enable the scanning of the display to be completed. The remainder of the envelopes do not receive a printed franking impression and receive only a blank impression. Where it is desired to frank a plurality of envelopes with the same value of postage charge, as shown in the flow chart of FIG. 4, after initiation of franking (block 50) the microprocessor may control the display head to display (block 51) the pattern continuously and to utilise the sensor 20 to sense (block 52) the number of scannings of the display head by light emitted by the photocopying apparatus. Accounting (block 53) is carried out in respect of the number of scannings detected by the sensor 20. Preferably for reasons of security, the pattern is displayed only for a time sufficient to enable scanning of the display head by the photocopying apparatus. When multiple envelopes are to be franked with the same value of postage charge and the pattern is displayed continuously, the display of the pattern is maintained after a scanning for a limited time period (block 54) corresponding to a time period expected to elapse until the next scanning and if no further scanning is detected the microprocessor terminates (block 55) the display of the pattern and ends (block 56) the franking operation. Alternatively, as illustrated by the flow chart of FIG. 5, upon initiation of a franking operation (block 60) the unit 10 may receive an input selecting the number of envelopes in a batch to be printed with a franking impression at the start of a franking operation for the batch of envelopes. A counter is set (block 61) to a count corresponding to the number of items to be franked. The display is operated (block 62) and upon detection (block 63) of the scanning light by sensor 20 postage is accounted for (block 64) and the counter is decremented (block 65). When the display head has been scanned to effect printing of the franking impression on the last item of the batch, that is to say when the counter has been decremented to zero (block 66), the microprocessor terminates (block 67) display of the pattern by the display head and ends (block 68) the franking operation.

The unit 10 is provided with means 21 to enable it to be located easily with the required orientation on the platform of the photocopier.

Conveniently, the unit 10 may be controlled by input from a personal computer 22 coupled to the unit by means of a cable or other communication link 23. The personal computer includes a processing unit 24, a display 25 and a keyboard 26. The communication link 23 is coupled to the processing unit 24 of the personal computer by a port 27 and is coupled to the unit 10 by means of an I/O port 28. The communication link 23 may include means to convey power from the personal computer to the unit 10 to power the components of the unit 10. Alternatively, the unit 10 may be powered by means of rechargeable batteries contained within the housing 29 of the unit or by replaceable batteries located externally of the housing 29 and connected to electronic components of the unit.

Operation of the unit 10 to display a pattern to be printed as a franking impression is controlled by the personal computer 22. Data relating to a required franking is input by a user by means of the keyboard 26 to the processing unit 24. Information relating to the progressing of the franking operation is displayed on the display 25 for the instruction and assistance of the user. The processing unit 24 outputs, via the port 27 and communication link 23, to the I/O port 28 of the unit 10 control signals instructing the unit to initiate a franking operation and data signals providing the unit 10 with data relating to the franking operation to be performed. The data will include postage charge for a mail item and may include, in the case of a batch of items, the number of items to be franked with that postage charge.

If desired the microprocessor 11 of the unit 10 may be controlled, by input of control signals from the personal computer, to display on the display head the contents of the registers of the memories 14, 15. The display on the display head may be viewed directly, or if desired, with the unit located on the photocopier, a copy of the displayed data may be printed by the photocopier on a paper sheet. Alternatively, the microprocessor may be controlled by input control signals to send register data via the I/O port 28 and communication link 23 to the personal computer for display on the display 25. The microprocessor may also be controlled to display on the display head or to send to the personal computer other data, for example data relating to functioning of the unit, as a service report for the unit.

It will be understood that the pattern displayed by the display means comprises parts corresponding to invariable parts of a franking impression to be printed and parts corresponding to variable parts of the franking impression consisting of variable postal information. It is envisaged that the whole pattern, including both invariable and variable parts, to be displayed will be determined by signals from the microprocessor to the display head. However if desired the display head may be so constructed as to always display the invariable parts when activated by the microprocessor and only the variable parts of the pattern are determined by signals from the microprocessor.

I claim:

1. Apparatus for franking mail items comprising a unit including electronic accounting and control means; display means controlled by the accounting and control means and means to enable input of control and data signals to the accounting and control means; said accounting and control means being operable in response to control and data signals to carry out accounting functions in respect of a postage charge to be applied to a mail item and to control the display means to display a pattern corresponding to a franking impression to be printed on a mail item, said franking impression including data indicative of the postage charge; and, in operative combination with said unit, photocopying apparatus operable to scan the pattern displayed by the display means and to print a franking impression corresponding to the pattern on a mail item.

2. Apparatus as claimed in claim 1 wherein the unit includes input/output means for communication with external control apparatus.

3. Apparatus as claimed in claim 1 wherein the accounting and control means is operable to control the display means to display data other than the pattern of the franking impression.

4. Apparatus as claimed in any one of claim 1 wherein the unit includes memory means for storing accounting data and wherein the accounting and control means is operable to control the display means to display accounting data stored in said memory means.

5. Apparatus as claimed in claim 1 including sensor means responsive to light emitted by the photocopying apparatus in scanning the pattern and wherein the accounting and control means is operative in response to the sensor means to prevent printing of a franking impression for which accounting has not been effected.

6. Apparatus as claimed in claim 5 wherein the accounting and control means is operative to terminate display of the pattern in response to the sensor means sensing light emitted by the photocopying apparatus.

7. Apparatus as claimed in claim 5 wherein the accounting and control means is operative in response to the sensor means sensing light emitted by the photocopying apparatus to effect an accounting operation in respect of a postage charge.

8. Apparatus for franking mail items comprising a unit including electronic accounting and control means; display means controlled by the accounting and control means and means to enable input of control and data signals to the accounting and control means; said accounting and control means being operable in response to control and data signals to carry out accounting functions in respect of a postage charge to be applied to a mail item and to control the display means to display a pattern corresponding to a franking impression to be printed on a mail item, said franking impression including data indicative of the postage charge; said unit being so constructed as to enable the unit to be located in operative combination with photocopying apparatus whereby the photocopying apparatus may be operated to scan the pattern displayed by the display means and to print a franking impression corresponding to the pattern on a mail item.

9. Apparatus as claimed in claim 8 wherein the unit includes input/output means for communication with external control apparatus.

10. Apparatus as claimed in claim 8 wherein the accounting and control means is operable to control the display means to display data other than the pattern of the franking impression.

11. Apparatus as claimed in any one of claim 8 wherein the unit includes memory means for storing accounting data and wherein the accounting and control means is operable to control the display means to display accounting data stored in said memory means.

12. Apparatus as claimed in claim 8 including sensor means responsive to light emitted by the photocopying apparatus in scanning the pattern and wherein the accounting and control means is operative in response to the sensor means to prevent printing of a franking impression for which accounting has not been effected.

13. Apparatus as claimed in claim 12 wherein the accounting and control means is operative to terminate display of the pattern in response to the sensor means sensing light emitted by the photocopying apparatus.

14. Apparatus as claimed in claim 12 wherein the accounting and control means is operative in response to the sensor means sensing light emitted by the photocopying apparatus to effect an accounting operation in respect of a postage charge.

* * * * *